United States Patent [19]

Man et al.

[11] Patent Number: 5,039,186

[45] Date of Patent: Aug. 13, 1991

[54] PRODUCTION OF NONLINEAR OPTICALLY RESPONSIVE POLYMERIC WAVEGUIDES

[75] Inventors: Hong-Tai Man, Somerset; Hyun-Nam Yoon, Union City, both of N.J.

[73] Assignee: Hoechst Celanese Corp., Somerville, N.J.

[21] Appl. No.: 570,062

[22] Filed: Aug. 20, 1990

[51] Int. Cl.[5] .......................... G02B 6/10; G02B 6/00
[52] U.S. Cl. ................................ 385/122; 428/411.1; 264/1.4; 385/130; 385/141; 359/332
[58] Field of Search .......................... 350/96.10–96.14, 350/96.34; 427/162, 164, 165; 307/425, 427, 430; 264/1.1, 1.3, 1.7; 252/582, 585; 428/411.1

[56] References Cited

U.S. PATENT DOCUMENTS

| | | | |
|---|---|---|---|
| 4,431,263 | 2/1984 | Garito | 350/96.34 |
| 4,536,450 | 8/1985 | Garito | 350/96.34 X |
| 4,762,912 | 7/1988 | Leslie et al. | 528/503 |
| 4,775,215 | 10/1988 | Teng et al. | 350/96.34 |
| 4,779,961 | 10/1988 | DeMartino | 350/350 R |
| 4,801,670 | 1/1989 | DeMartino et al. | 350/96.34 X |
| 4,804,255 | 2/1989 | Choe | 350/354 |
| 4,808,332 | 2/1989 | DeMartino et al. | 526/312 |
| 4,842,677 | 6/1989 | Wojnarowski | 156/643 |
| 4,882,865 | 11/1989 | Andeweg | 40/442 |
| 4,894,066 | 1/1990 | Castelli | 44/589 |
| 4,932,737 | 6/1990 | Yoon et al. | 350/96.14 |
| 4,932,738 | 6/1990 | Haas et al. | 350/96.14 |
| 4,936,644 | 6/1990 | Raskin et al. | 350/96.12 |
| 4,946,235 | 8/1990 | Scozzafava et al. | 350/96.34 |
| 4,971,416 | 11/1990 | Khanarian et al. | 350/96.12 |

Primary Examiner—Akm Ullah
Attorney, Agent, or Firm—Michael W. Ferrell

[57] ABSTRACT

This invention provides process embodiments for the production of second order nonlinear optical media and waveguiding devices. An important aspect of an invention waveguiding device is the use of a novel electrode design which permits the application of a high voltage electric field for molecular orientation of a dipolar organic waveguiding medium.

19 Claims, 3 Drawing Sheets

PRODUCTION OF NONLINEAR OPTICALLY RESPONSIVE POLYMERIC WAVEGUIDES

BACKGROUND OF THE INVENTION

Optical waveguides consist of a transparent waveguiding core surrounded by transparent materials of lower indices of refraction. Several general methods are utilized for the fabrication of optical waveguides.

Optical waveguides fabricated in GaAs/AlGaAs structure by laser-assisted etching has been reported in Integrated And Guided-Wave Optics, 1989 Technical Digest Series, 4, 64–67 (Optical Society of America).

U.S. Pat. No. 4,842,677 describes excimer laser etching of high resolution conductive patterns involving the use of an organic polymeric resist. Other publications relating to photoablation of organic polymers include J. Appl. Phys., 66(3), 1411 (1989).

Methods of fabricating organic waveguides are a newly evolving technology. There are inherent disadvantages in the practice of the various known methods, such as difficult multi-step procedures which do not provide reliable quality control and reproducibility. Typical organic waveguiding media exhibit high optical scattering losses.

A review article in Journal Of Lightwave Technology, 7(10), 1445 (1989) describes several polymeric channel waveguide fabrication routes, such as etching methods which include wet chemistry etching, reactive ion etching, excimer laser ablation, and the like.

New developments in electrooptically active organic waveguide technology involve the use of polymers with side chain that exhibit second order nonlinear optical susceptibility. Side chain polymers are described in U.S. Pat. Nos. 4,801,670; 4,804,255; 4,808,332; 4,882,865; and 4,865,406.

When a side chain polymer waveguiding thin film medium is subjected to an electric field to induce a noncentrosymmetric molecular orientation of the polymer side chains, the waveguiding medium exhibits second order nonlinear optical susceptibility $\chi^{(2)}$ and linear electrooptic effects.

The electrooptic activity of the side chain polymer waveguiding medium is proportional to the degree of noncentrosymmetric molecular orientation induced by electric field poling, which in turn is proportional to the strength of the applied electric field. The amount of voltage which can be applied for electric field poling is limited because dielectric breakdown occurs, due to extrinsic factors such as field enhancement at the electrode edges. Consequently a typical noncentrosymmetric organic waveguide medium has a linear electrooptical coefficient r of less than about 20 pm/V at 1.3 $\mu$m.

There is continuing interest in the development of new and improved techniques for the fabrication of organic optical waveguides which overcome some of the inherent deficiencies of optical waveguide formation in transparent organic media.

Accordingly, it is an object of this invention to provide an improved method for the production of organic optical waveguides.

It is another object of this invention to provide a method for the production of noncentrosymmetric polymeric optical waveguides by electric field poling with electrodes having a novel structural configuration.

It is a further object of this invention to provide process embodiments for the production of side chain polymeric optical waveguides which have a two-dimensional channel waveguiding structure, and which have a linear electrooptic coefficient r of at least about 20 pm/V.

Other objects and advantages of the present invention shall become apparent from the accompanying description and Examples.

DESCRIPTION OF THE INVENTION

One or more objects of the present invention are accomplished by the provision of a process for producing a linear electrooptically active medium which comprises:

(a) forming a first thin film metal electrode on a supporting substrate;

(b) forming an optical waveguiding layer of an electric field-polable organic medium in coextensive proximity with the metal electrode film;

(c) applying a thin film mask with an open-spaced pattern in contact with the waveguiding organic medium surface, and with organic medium surface exposed through the thin film mask open-spaced pattern;

(d) applying a polymeric coating in contact with the thin film mask and the exposed waveguiding organic medium pattern;

(e) forming a second thin film metal electrode in coextensive proximity with the polymeric coating, wherein the second metal electrode coincides in structure and position with the underlying exposed waveguiding organic medium pattern, and the edges of the second metal electrode are positioned higher than the interior surface area of the electrode structure; and (f) applying an electric field between the two electrodes to induce a noncentrosymmetric molecular orientation in the exposed waveguiding organic medium pattern.

The waveguiding zone of the optical medium can consist of a laminate of two or more electric field-polable organic thin films, which exhibit linear electrooptical response when in a poled noncentrosymmetric molecular orientation. In a preferred embodiment a present invention medium exhibits a linear electrooptical coefficient r of at least about 20 pm/V, as measured at 1.3 $\mu$m wavelength.

The thin film mask in step (c) typically is a material which is amenable to pattern formation, e.g., a photoresist composition such as AZ-1518 positive resist (Hoechst Corp.) which is utilized in combination with a type A etchant (Transene Corp.).

The coating applied in step (d) is a thermoplastic polymer such as polymethyl methacrylate or polyurethane. The coating also can be a polymer with electrooptical properties, as described more fully hereinbelow.

The purpose of the coating in step (d) is to partially fill and smooth the recessed pattern structure formed by the laminated combination of the thin film mask and the exposed surface of the waveguiding organic medium. The coated pattern has a smooth-wall concave configuration, which facilitates the formation of the second electrode with elevated edges as an essential feature of an invention linear electrooptically responsive medium.

In another embodiment this invention provides a method for constructing an optical waveguide which comprises:

(a) forming a first thin film metal electrode on a supporting substrate;

(b) forming a first thin film cladding of a polymer in coextensive proximity with the metal electrode;

(c) forming a side chain polymer optical waveguiding layer in contact with the first thin film cladding;

(d) forming a second thin film cladding of a polymer in contact with the waveguiding layer;

(e) forming a grooved concave channel across the second thin film cladding by removal of polymer mass;

(f) forming a second thin film metal electrode in coextensive proximity with the grooved thin film cladding, wherein the second metal electrode coincides in structure and position with the underlying grooved concave channel configuration, and the edges of the second metal electrode are positioned higher than the interior surface area of the electrode structure; and (g) applying an electrode field between the two electrodes to induce a noncentrosymmetric molecular orientation in the waveguiding layer;

wherein the waveguiding layer polymer has side chains which exhibit second order nonlinear optical susceptibility, and the waveguiding layer has a higher refractive index than the cladding thin films.

In another embodiment this invention provides a method for constructing an optical waveguide which comprises:

(a) forming a first thin film metal electrode on a supporting substrate;

(b) forming a first thin film cladding of a polymer in coextensive proximity with the metal electrode;

(c) forming a side chain polymer optical waveguiding layer in contact with the first thin film cladding;

(d) forming a second thin film cladding of a polymer in contact with the waveguiding layer;

(e) forming a grooved channel well across the second thin film cladding by removal of polymer mass;

(f) applying a polymeric coating in contact with the grooved thin film cladding;

(g) forming a second thin film metal electrode in coextensive proximity with the polymeric coating, wherein the second metal electrode coincides in structure and position with the underlying groove channel configuration, and the edges of the second metal electrode are positioned higher than the interior surface area of the electrode structure; and (h) applying an electric field between the two electrodes to induce a noncentrosymmetric molecular orientation in the waveguiding layer;

wherein the waveguiding layer polymer has side chains which exhibit second order nonlinear optical susceptibility, and the waveguiding layer has a higher refractive index than the cladding thin films.

In another embodiment this invention provides a method for constructing an optical waveguide which comprises:

(a) forming a first thin film metal electrode on a supporting substrate;

(b) forming a first thin film cladding of a side chain polymer in coextensive proximity with the metal electrode;

(c) forming a side chain polymer optical waveguiding layer in contact with the first thin film cladding;

(d) applying a thin film mask with an open-spaced channel pattern to the waveguiding layer surface, and with a channel pattern of waveguiding layer surface exposed through the thin film mask;

(e) forming a second thin film cladding of a side chain polymer in contact with the thin film mask and the exposed waveguiding layer channel pattern;

(f) forming a second thin film metal electrode in coextensive proximity with the second thin film cladding, wherein the metal electrode coincides in structure and position with the underlying waveguiding layer channel pattern, and the edges of the second electrode are positioned higher than the interior surface area of the electrode structure; and (g) applying an electric field between the two electrodes to induce a noncentrosymmetric molecular orientation of the polymer side chains in the waveguiding layer channel pattern;

wherein the waveguiding layer polymer has side chains which exhibit second order nonlinear optical susceptibility, and the waveguiding layer has a higher refractive index than the cladding thin films.

In another embodiment this invention provides a method for constructing ann optical waveguide which comprises:

(a) forming a first thin film metal electrode on a supporting substrate;

(b) forming a first thin film cladding of a polymer in coextensive proximity with the metal electrode;

(c) forming a side chain polymer optical waveguiding layer in contact with the first thin film cladding;

(d) forming a second thin film cladding of a polymer in contact with the waveguiding layer;

(e) applying a thin film mask with an open-spaced channel pattern to the second thin film cladding surface, and with a pattern of cladding surface exposed through the thin film mask;

(f) applying a polymeric coating in contact with the thin film mask and the exposed thin film cladding channel pattern;

(g) forming a second thin film metal electrode in coextensive proximity with the polymeric coating, wherein the second metal electrode coincides in structure and position with the underlying thin film mask channel pattern, and the edges of the second metal electrode are positioned higher than the interior surface area of the electrode structure; and (h) applying an electric field between the two electrodes to induce a noncentrosymmetric molecular orientation in the waveguiding layer; wherein the waveguiding layer polymer has side chains which exhibit second order nonlinear optical suceptibility, and the waveguiding layer has a higher refractive index than the cladding thin films.

In another embodiment this invention provides an optical waveguide which has a thin film laminated structure comprising:

(a) a first thin film metal electrode on a supporting substrate;

(b) an optical waveguiding organic layer in coextensive proximity with the thin film metal electrode, wherein the organic layer has a noncentrosymmetric molecular orientation, and exhibits second order nonlinear optical susceptibility $\chi^{(2)}$; and (c) a second thin film metal electrode in coextensive proximity with the waveguiding organic layer; wherein the edges of the second metal electrode are positioned higher than the interior surface area of the electrode structure.

In a further embodiment this invention provides an optical waveguide which has a thin film laminated structure comprising:

(a) a first thin film metal electrode on a supporting substrate;

(b) a first thin film cladding of a polymer in coextensive proximity with the metal electrode;

(c) a side chain polymer optical waveguiding layer in contact with the first thin film cladding;

(d) a second thin film cladding of a polymer in contact with the waveguiding layer; and (e) a second thin film metal electrode in coextensive proximity with the second thin film cladding; wherein the edges of the second metal electrode are positioned higher than the interior surface area of the electrode structure;

wherein the waveguiding layer polymer has side chains which exhibit second order nonlinear optical susceptibility and which have a noncentrosymmetric molecular orientation, and the waveguiding layer has a higher refractive index than the cladding thin films.

A present invention optical waveguide can function as a nonlinear optical component in a laser frequency converter, an electrooptical Pockels effect device, a waveguide electrooptical interferometric device, a wide-band electrooptical guided wave analog-to digital converter, an optical multiplexer, an optical demultiplexer, and the like, as elaborated in U.S. Pat. No. 4,775,215.

The polymeric waveguiding medium in an invention optical waveguide device is transparent, preferably amorphous in physical properties, and exhibits nonlinear optical response. The polymeric waveguiding medium has a higher refractive index (e.g., 1.6) than the surrounding proximate matrix which interfaces the waveguiding medium surfaces.

Multiple polymeric thin films in a laminated matrix structure can be applied to the supporting substrate by conventional methods, such as spin coating, spraying, Langmuir-Blodgett deposition, and the like. The thin films typically will have a thickness between about 0.5-10 microns.

A present invention two-dimensional waveguide channel typically will have dimensions in the range of about 1.5-10 $\mu m \times 1.5$-10 $\mu m \times 0.5$-10 cm, and under wave propagating conditions will exhibit an optical loss of less than 2 dB/cm.

A supporting substrate in an invention waveguide can be constructed of any convenient non-conducting medium such as plastic, glass, or silicon.

The term "transparent" as employed herein refers to a polymeric waveguiding medium which is transparent or light transmitting with respect to incident fundamental and created light frequencies. Under operational conditions such as with a frequency converting waveguide device, the polymeric waveguiding nonlinear optical medium is transparent to both the incident and exit light frequencies.

The term "amorphous" as employed herein refers to a transparent polymeric optical medium which does not have crystalline regions with a preferred short range molecular order and a higher density that can act as optically scattering centers.

The term "electric field" as employed herein refers to a high voltage electric field which is applied to a substrate of mobile molecules to induce dipolar alignment of the molecules parallel to the field.

An invention organic thin film waveguiding medium consists of a polymeric phase that contains nonlinear optically active and dipolar chromophores. The chromophores can be incorporated as homogeneously dispersed guest molecules in the polymeric phase, or can be covalently bonded to the polymer main chain as pendant side chains.

The organic thin film waveguiding medium can consist or a host polymer such as poly(methyl methacrylate), and a guest organic compound which exhibits nonlinear optical response, such as 4-nitroaniline, 2-methyl-4-nitroaniline, 1-dimethylamino-4-nitronaphthalene, 2-chloro-4-nitroaniline, 4-dimethylamino-4'-nitrostilbene, 13,13-diamino-14,14-dicyanodiphenoquinodimethane, and the like. A host polymer can be selected which also exhibits nonlinear optical response.

A present invention optical waveguide laminated matrix preferably has side chain polymers in the waveguiding medium and in cladding thin films, which are characterized by a recurring monomeric unit corresponding to the formula:

where P' is a polymer main chain unit, S' is a flexible spacer group having a linear chain length of between about 2-20 atoms, M' is a pendant group which exhibits second order nonlinear optical susceptibility, and where the pendant groups comprise at least about 25 weight percent of the polymer, and the polymer has a glass transition temperature or softening point above about 40° C.

Among the preferred types of side chain polymers are those characterized by a recurring monomeric unit corresponding to the formula:

where m is an integer of at least 5; n is an integer between about 2-20; X is —NR—, —O— or —S—; R is hydrogen or a $C_1-C_4$ alkyl; and z is —NO$_2$, —CN, —CF$_3$, —CH=C(CN)$_2$, —C(CN)=C(CN)$_2$ or —SO$_2$CF$_3$.

Side chain polymers of interest are described in U.S. Pat. Nos. 4,894,066; 4,762,912; 4,779,961; 4,801,670; and 4,808,332. Illustrative of side chain polymer species are poly[6-(4-nitrobiphenyloxy)hexyl methacrylate], poly(L-N-p-nitrophenyl-2-piperidinemethyl acrylate), and stilbene-containing polymers such as a copolymer of 4-[N-(2-methacroyloxyethyl)-N-methylamino]-4'- nitrostilbene and a $C_1$-$C_6$ alkyl acrylate or methacrylate:

Useful amorphous side chain polymers are described in copending patent application S.N. 468,676, filed Jan. 23, 1990.

Poling of a present invention optical waveguide laminated matrix of side chain polymers in the waveguiding channel and the cladding thin films can be accomplished conveniently by heating the matrix near its melting point or glass transition temperature, then applying a DC electric field (e.g., 50–300 V/μm) to the matrix to align side chain dipoles in uniaxial orientation. The matrix then is cooled while the matrix is still under the influence of the applied DC electric field. In this manner a stable and permanent molecular orientation is immobilized in a rigid structure within the poled domains.

The thin film electrode layers in an optical waveguide matrix typically are composed of a conductive medium such as aluminum, silver or gold. A thin film metal electrode can be applied by electron beam vacuum deposition or electroplating means, and normally will have a thickness between about 0.1–4 micron.

An important aspect of a present invention optical waveguide is the presence of a unique structure in one of the two thin film electrodes. The electrode configuration has elevated rimmed edges which are positioned higher than the interior surface area of the electrode structure. This design minimizes electric field enhancement at the electrode edges and permits the application of a high voltage during the poling cycle of waveguide fabrication.

A DC field of at least about 150 V/μm can be applied in the poling cycle without dielectric breakdown and can achieve a poled two-dimensional channel waveguiding medium with an electrooptic coefficient r of at least about 20 pm/V at 1.3 μm.

The following examples are further illustrative of the present invention. The optical waveguide device components are presented as being typical, and various modifications in design and operation can be derived in view of the foregoing disclosure within the scope of the invention.

EXAMPLE I

Figure 1:
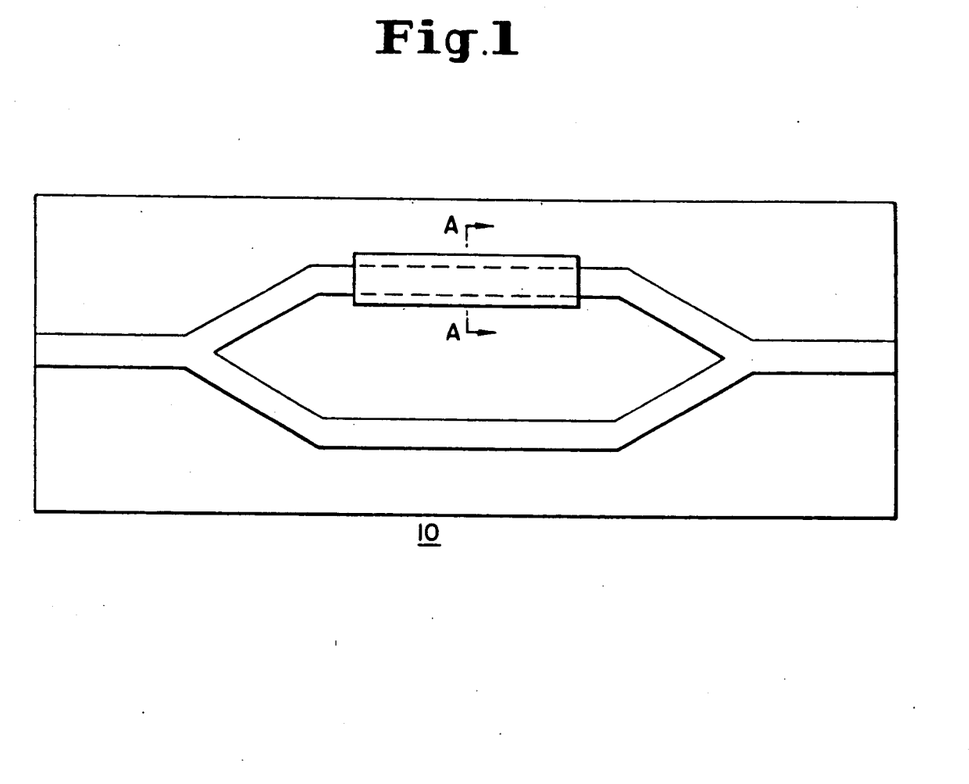
FIG. 1 is a schematic top view drawing of a conventional Mach-Zehnder interferometric electrooptic light modulator.
Figure 1A:
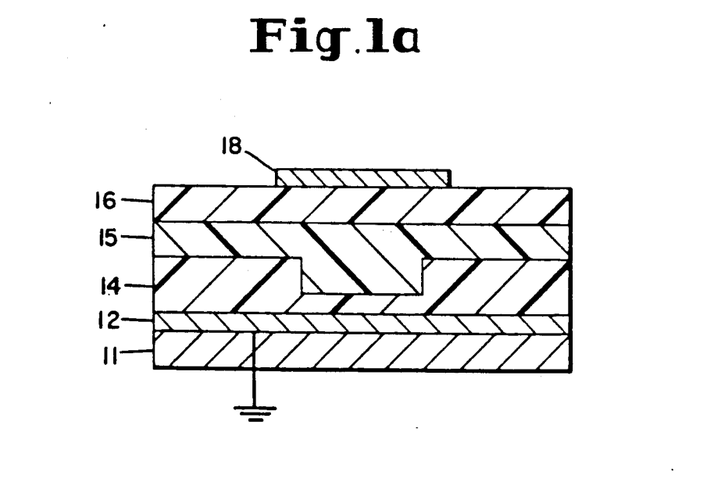
FIG. 1a is a cross-sectional view taken along line A in FIG. 1.

This example illustrates the construction of a Mach-Zehnder waveguide electrooptic modulator with electrodes of conventional design as shown in FIG. 1 and cross-sectional FIG. 1a.

A commercially available silicon dioxide-coated silicon wafer 11 is placed in a Varian electron beam vacuum deposition system. A 0.1 μm electrode 12 layer of 99.999% purity gold is deposited on wafer 11.

Gold electrode 12 is covered with a 8.0 μm organic cladding layer 14 of a 25% by weight solution in cyclohexanone of a mixture of two copolymers of methyl methacrylate/4-[N-(2-methacryloxyethyl)-N-methylamino]-4'-nitrostilbene with the copolymer composition of 50/50 and 65/35 in the ratio of 3:1, respectively, by spin coating at 1000 rpm for 20 seconds on a Solitec model 5100 coater. Cladding layer 14 is dried in a vacuum oven at 160° C. for one hour. The organic polymers have a weight average molecular weigh of 40,000 and cladding layer 14 has a refractive index of 1.623.

A photoresist layer of AZ-1518 (Hoechst) is spin-coated on cladding layer 14 at 4000 rpm for 30 seconds. The photoresist coating is dried in a vacuum oven at 90° C. for 30 minutes. The photoresist coating is patterned in the form of a Mach-Zehnder interferometric waveguide 10 as represented in FIG. 1, by contacting the photoresist coating with the mask in a Karl Suss model MJB3 mask aligner and exposing the masked coating to 405 nm radiation (120 mJ/$cm^2$). The waveguide width is 5 μm. The Y junction channels separate and recombine at a full angle of 1.2 degrees.

The mask is removed and the patterned photoresist is developed with AZ-400K developer in water (1:1) over a period of 45 seconds, and the developing cycle is terminated by washing with deionized water. The patterned photoresist is baked in a vacuum oven at 120° C. for 30 minutes.

The upper surface of the patterned photoresist is exposed to reactive ion etching for 10 minutes in a Plasmafab 340 etcher (Electrotech Co.). The etching conditions are five standard cubic centimeters per minute of $O_2$ flowing at 15 mTorr pressure with 30 watts/6" diameter platten of 13.56 r.f. power. This provides 3 μm deep channel in cladding layer 14 in the form of a Mach-Zehnder interferometric waveguide. The remaining photoresist coating is removed by immersion of the waveguide structure in AZ-400K developer for one minute.

Nonlinear optically active waveguiding layer 15 is spin-coated on the cladding layer 14 Mach-Zehnder waveguide channel pattern. The spin coating medium is a 20% solution of copolymer (50/50) of methyl methacrylate/4-[N-(2-methacryloxyethyl)-N-methylamino]-4'-nitrostilbene in cyclohexanone. At a spin-coating speed of 2000 rpm, the waveguide layer has a thickness of about 2 μm outside the channel. The two-layer structure is dried in a vacuum oven at 160° C. for one hour. The refractive index of waveguiding layer 15 is 1.630.

The dried multilayer channel waveguide assembly is spin-coated with a 15 μm upper cladding layer 16 in the same manner as for lower cladding layer 14. A photoresist layer of AZ-1518 is spin-coated on cladding layer 16 at 4000 rpm for 30 seconds. The photoresist coating is dried in a vacuum oven a 90° C. for 30 minutes. The photoresist is patterned in the form of the upper electrode of the Mach-Zehnder electrooptic modulator by contacting the photoresist with the electrode mask in a Karl Suss MJB3 mask aligner and exposing the masked coating to 405 nm radiation. The mask is removed and the exposed photoresist is developed with AZ-400K developer in water (1:1) over a period of 45 seconds, and the development cycle is terminated by washing with deionized water. The developed photoresist coating is then baked in a vacuum oven at 120° C. for 30 minutes.

A 0.1 μm layer of 99.999% purity gold is deposited selectively on the developed photoresist using a mask in the shape of top electrode 18. After the gold evaporation, the remaining upper photoresist layer is removed by immersion of the wafer in AZ-400K developer for one minute to leave gold electrode 18 in the desired pattern.

The polymeric waveguide device is electrically poled to align the polymer molecules. This is accomplished by placing the device in a Mettler hot stage and heating it to 140° C. at 10° C./min. A DC field up to about 120 V/μm is applied to the electrodes for a period of 10 minutes. The device then is cooled to room temperature while maintaining the electrical field and the molecular orientation.

Figure 2:
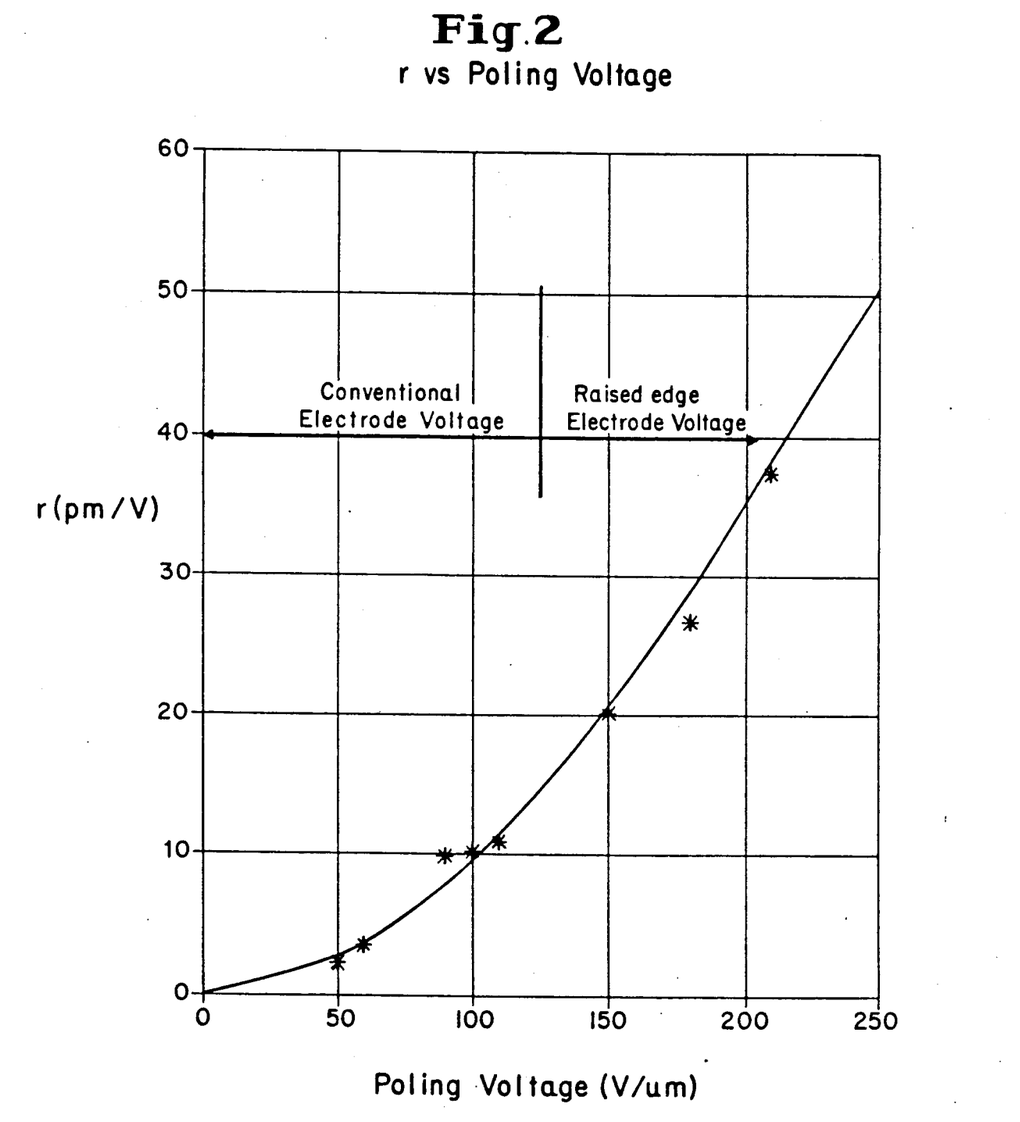
FIG. 2 is a graphic representation of electrooptic coefficient r relative to poling voltage, as described in Examples I-II.

With this type of conventional poling electrode design a voltage higher than 120 V/μm causes dielectric breakdown of the device. FIG. 2 illustrates that with a device having conventional electrode design the applied poling voltage only can achieve a low electrooptic coefficient r value in waveguiding layer 15 before dielectric breakdown.

EXAMPLE II

Figure 3:
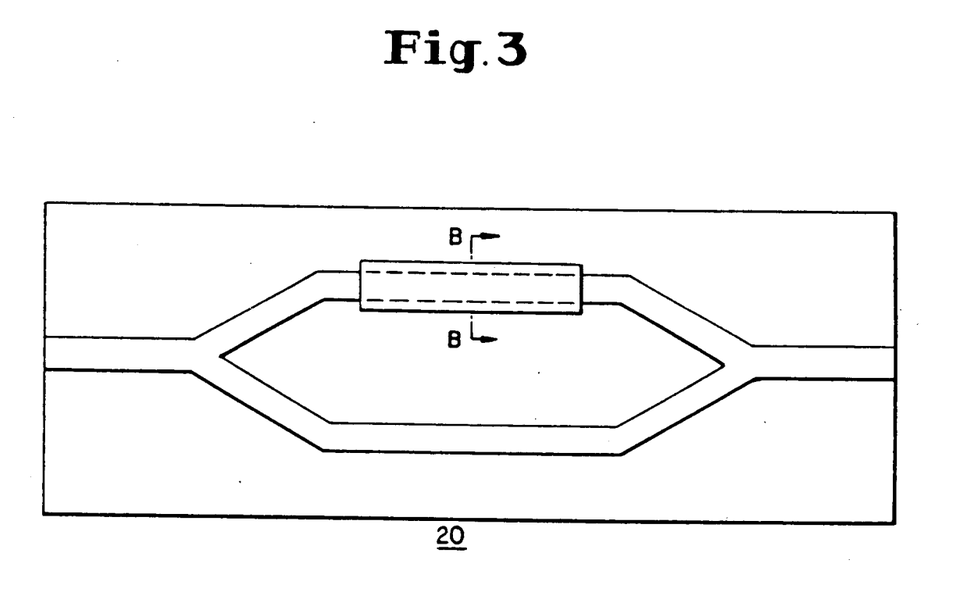
FIG. 3 is a schematic top view drawing of a Mach-Zehnder interferometric electrooptic light modulator in accordance with the present invention.
Figure 3A:
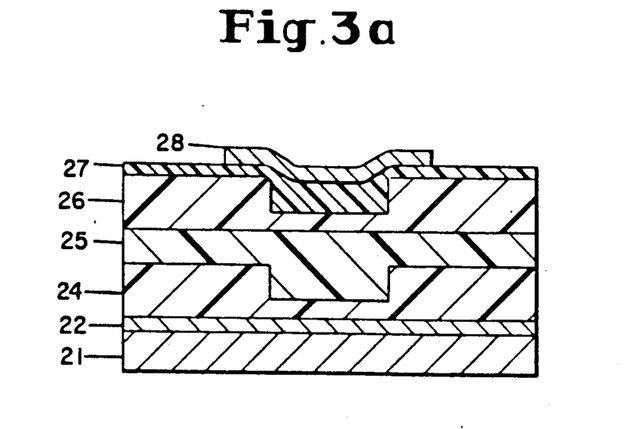
FIG. 3a is a cross-sectional view taken along line B in FIG. 3.

This example illustrates the construction of a Mach-Zehnder waveguide electrooptic modulator in which the top poling electrode has raised edges in accordance with the present invention as represented in FIG. 3 and cross-sectional FIG. 3a.

A commercially available silicon dioxide-coated silicon wafer 21 is placed in a Varian electron beam vacuum deposition system. A 0.1 μm electrode layer 22 of 99.999% purity gold is deposited on wafer 21.

Gold electrode 21 is covered with a 8.0 μm lower organic cladding layer 24 of a 25% by weight solution in cyclohexanone of a mixture of two copolymers of methyl methacrylate/4-[N-(2-methacryloxyethyl)-N-methylamino]-4'nitrostilbene with the copolymer composition of 50/50 and 65/35 in the ratio of 3:1, respectively, by spin coating at 1000 rpm for 20 seconds on a Solitec model 5100 coater. Cladding layer 24 is dried in a vacuum oven at 160° C. for one hour. The organic polymers have a weight average molecular weight of 40,000 and cladding layer 24 has a refractive index of 1.623.

A photoresist layer of AZ-1518 (Hoechst) is spin-coated on cladding layer 24 at -4000 rpm for 30 seconds. The photoresist coating is dried in a vacuum oven at 90° C. for 30 minutes. The photoresist coating is patterned in the form of a Mach-Zehnder interferometric waveguide as represented in FIG. 3, by contacting the photoresist coating with the mask in a Karl Suss model MJB3 mask aligner and exposing the masked coating to 405 nm radiation (120 mJ/cm²). The waveguide width is 5 μm. The Y junction channels separate and recombine at a full angle of 1.2 degrees.

The mask is removed and the patterned photoresist is developed with AZ-400K developer in water (1:1) over a period of 45 seconds and the developing cycle is terminated by washing with deionized water. The photoresist coating of the wafer is baked in a vacuum oven at 120° C. for 30 minutes.

The upper surface of the structure is exposed to reactive ion etching for 10 minutes in a Plasmafab 340 etcher (Electrotech Co.). The etching conditions are five standard cubic centimeters per minute of $O_2$ flowing at 15 mTorr pressure with 30 watts/6" diameter platten of 13.56 r.f. power. This provides a 3 μm deep channel in cladding layer 24 in the form of a Mach-Zehnder interferometric waveguide. The remaining photoresist coating is removed by immersion of the waveguide structure in AZ-400K developer for one minute.

Nonlinear optically active organic layer 25 is spin-coated on the cladding layer 24 Mach-Zehnder waveguide channel pattern. The spin coating medium is a 20% solution of copolymer (50/50) of methyl methacrylate/4-[N-(2-methacryloxyethyl)-N-methylamino]-4'-nitrostilbene in cyclohexanone. At a spin-coating speed of 2000 rpm, the waveguide layer has a thickness of about 2 μm outside the channel. The two-layer structure is dried in a vacuum oven at 160° C. for one hour. The refractive index of the waveguiding layer is 1.630.

The dried multilayer channel waveguide is spin-coated with a 15 μm upper cladding layer 26 in the same manner as for lower cladding layer 24. A 1.5 μm layer of photoresist is spin-coated on cladding layer 26, and following the procedures described above a pattern for the top electrode is defined. The patterned photoresist is exposed to reactive ion etching 10 minutes under oxygen plasma conditions as previously described to define a 3 μm deep well in cladding layer 26 in the shape of the top electrode. The remaining photoresist coating is removed in AZ-400K developer for one minute.

A 15% solution of the cladding layer 26 type organic material in cyclohexanone is spin-coated at 4000 rpm to smooth out the well in cladding layer 26 with smoothing layer 27. The thickness of smoothing layer 27 is about 0.5 μm in the flat areas.

A photoresist of AZ-1518 is spin-coated on smoothing layer 27 at 4000 rpm for 30 seconds. The photoresist coating is dried in a vacuum oven at 90° C. for 30 minutes. The photoresist is patterned in the form of the upper electrode of the Mach-Zehnder electrooptic modulator by contacting the photoresist with the electrode mask in a Karl Suss MJB3 mask aligner and exposing the masked coating to 405 nm radiation. The mask is removed and the exposed photoresist is developed with AZ-400K developer in water (1:1) over a period of 45 seconds and the development cycle is terminated by washing with deionized water. The developed photoresist coating is then baked in a vacuum oven at 120° C. for 30 minutes.

A 0.1 μm layer of 99.999 % purity gold is deposited on the developed photoresist using a mask in the shape of top electrode 28. The size of top electrode 28 is such that the electrode edges extend beyond the well edges in cladding layer 26. After the gold evaporation, the remaining photoresist coating is removed by immersion of the wafer in AZ-400K developer for one minute to provide gold electrode 28 in the desired pattern.

The polymeric waveguide device is electrically poled to align the polymer molecules. This is accomplished by placing the device in a Mettler hot stage and heating it to 140° C. at 10 ° C./min. A DC field at 200 V/μm is applied to the electrodes for a period of 10 minutes. The device then is cooled to room temperature while maintaining the electrical field and the molecular orientation. Because the geometry of top electrode 28 is fabricated with raised edges as illustrated in FIG. 3a, premature dielectric breakdown during poling is greatly reduced. As shown in FIG. 2, a 210 V/μm poling voltage can be applied to the device before dielectric breakdown occurs, and a high electrooptic coefficient r is obtained in waveguiding layer 25.

In a preferred variation of the above described device fabrication procedures, the well in cladding layer 26 is formed by means of laser ablation.

Radiation from a Lambda Physik 193 nm excimer laser is passed through a 10 μm by 10 μm aperture and imaged on the upper surface of cladding layer 26. The laser is in a pulse mode with a 50 Hz repetition rate and a power density of about 1 J/cm$^2$ incident on the surface area during each nanosecond pulse. The device is translated through the image plane of the aperture at a rate of one millimeter per second. This process removes the polymer in the regions exposed to the laser beam to form a 10 μm wide well in cladding layer 26 in the shape of the top electrode.

A smoothing layer is spun to smooth out the well. The top electrode then is deposited, and molecular alignment by poling is accomplished as previously described.

What is claimed is:

1. An optical waveguide which has a thin film laminated structure comprising:
   (a) a first thin film metal electrode on a supporting substrate;
   (b) a first thin film cladding of a polymer in coextensive proximity with the metal electrode;
   (c) a side chain polymer optical waveguiding layer in contact with the first thin film cladding;
   (d) a second thin film cladding of a polymer in contact with the waveguiding layer; and
   (e) a second thin film metal electrode in coextensive proximity with the second thin film cladding; wherein the edges of the second metal electrode are positioned higher than the interior surface area of the electrode structure;
   wherein the waveguiding layer polymer has side chains which exhibit second order nonlinear optical susceptibility and which have a noncentrosymmetric molecular orientation, and the waveguiding layer has a higher refractive index than the cladding thin films wherein waveguiding layer exhibits a linear electrooptic constant r of at least about 20 pm/V as measured at 1.3 μm wavelength.

2. An optical waveguide in accordance with claim 1 which has at least two side chain polymer optical waveguiding layers.

3. A method for constructing a second order nonlinear optically responsive medium which comprises:
   (a) forming a first thin film metal electrode on a supporting substrate;
   (b) forming an optical waveguiding layer of an electric field-polable organic medium in coextensive proximity with the metal electrode film;
   (c) applying a thin film mask with an open-spaced pattern in contact with the waveguiding organic medium surface, and with organic medium surface exposed through the thin film mask open-spaced pattern;
   (d) applying a polymeric coating in contact with the thin film mask and the exposed waveguiding organic medium pattern;
   (e) forming a second thin film metal electrode in coextensive proximity with the polymeric coating, wherein the second metal electrode coincides in structure and position with the underlying exposed waveguiding organic medium pattern, and the edges of the second metal electrode are positioned higher than the interior surface area of the electrode structure; and
   (f) applying an electric field between the two electrodes to induce a noncentrosymmetric molecular orientation in the exposed waveguiding organic medium pattern.

4. A method in accordance with claim 3 wherein at least two optical waveguiding layers are applied in step(b).

5. A method in accordance with claim 3 wherein the thin film mask in step(c) is a photoresist composition.

6. A method in accordance with claim 3 wherein the coating is step(d) is a polymer with electric field-polable side chains.

7. A method for constructing an optical waveguide which comprises:
   (a) forming a first thin film metal electrode on a supporting substrate;
   (b) forming a first thin film cladding of a polymer in coextensive proximity with the metal electrode;
   (c) forming a side chain polymer optical waveguiding layer in contact with the first thin film cladding;
   (d) forming a second thin film cladding of a polymer in contact with the waveguiding layer;
   (e) forming a grooved concave channel across the second thin film cladding by removal of polymer mass;
   (f) forming a second thin film metal electrode in coextensive proximity with the grooved thin film cladding, wherein the second metal electrode coincides in structure and position with the underlying grooved concave channel configuration, and the edges of the second metal electrode are positioned higher than the interior surface area of the electrode structure; and
   (g) applying an electric field between the two electrodes to induce a noncentrosymmetric molecular orientation in the waveguiding layer;
   wherein the waveguiding layer polymer has side chains which exhibit second order nonlinear optical susceptibility, and the waveguiding layer has a higher refractive index than the cladding thin films.

8. A method for constructing an optical waveguide which comprises:
   (a) forming a first thin film metal electrode on a supporting substrate;
   (b) forming a first thin film cladding of a polymer in coextensive proximity with the metal electrode;
   (c) forming a side chain polymer optical waveguiding layer in contact with the first thin film cladding;
   (d) forming a second thin film cladding of a polymer in contact with the waveguiding layer;
   (e) forming a grooved channel well across the second thin film cladding by removal of polymer mass;
   (f) applying a polymeric coating in contact with the grooved thin film cladding;
   (g) forming a second thin film metal electrode in coextensive proximity with the polymeric coating, wherein the second metal electrode coincides in structure and position with the underlying grooved channel configuration, and the edges of the second metal electrode are positioned higher than the interior surface area of the electrode structure; and (h) applying an electric field between the two electrodes to induce a noncentrosymmetric molecular orientation in the waveguiding layer and cladding thin films;

wherein the waveguiding layer polymer has side chains which exhibit second order nonlinear optical susceptibility, and the waveguiding layer has a higher refractive index than the cladding thin films.

9. A method for constructing an optical waveguide which comprises:

(a) forming a first thin film metal electrode on a supporting substrate;

(b) forming a first thin film cladding of a polymer in coextensive proximity with the metal electrode;

(c) forming a side chain polymer optical waveguiding layer in contact with the first thin film cladding;

(d) applying a thin film mask with an open-spaced channel pattern to the waveguiding layer surface, and with a channel pattern of waveguiding layer surface exposed through the thin film mask;

(e) forming a second thin film cladding of a polymer in contact with the thin film mask and the exposed waveguiding layer channel pattern;

(f) forming a second thin film metal electrode in coextensive proximity with the second thin film cladding, wherein the metal electrode coincides in structure and position with the underlying waveguiding layer channel pattern, and the edges of the second electrode are positioned higher than the interior surface area of the electrode structure; and (g) applying an electric field between the two electrodes to induce a noncentrosymmetric molecular orientation of the polymer side chains in the waveguiding layer channel pattern;

wherein the waveguiding layer polymer has side chains which exhibit second order nonlinear optical susceptibility, and the waveguiding layer has a higher refractive index than the cladding thin films.

10. A method for constructing an optical waveguide which comprises:

(a) forming a first thin film metal electrode on a supporting substrate;

(b) forming a first thin film cladding of a polymer in coextensive proximity with the metal electrode;

(c) forming a side chain polymer optical waveguiding layer in contact with the first thin film cladding;

(d) forming a second thin film cladding of a polymer in contact with the waveguiding layer;

(e) applying a thin film mask with an open-spaced channel pattern to the second thin film cladding surface, and with a pattern of cladding surface exposed through the thin film mask;

(f) applying a polymeric coating in contact with the thin film mask and the exposed thin film cladding channel pattern;

(g) forming a second thin film metal electrode in coextensive proximity with the polymeric coating, wherein the second metal electrode coincides in structure and position with the underlying thin film mask channel pattern, and the edges of the second metal electrode are positioned higher than the interior surface area of the electrode structure; and (h) applying an electric field between the two electrodes to induce a noncentrosymmetric molecular orientation in the waveguiding layer;

wherein the waveguiding layer polymer has side chains which exhibit second order nonlinear optical susceptibility, and the waveguiding layer has a higher refractive index than the cladding thin films.

11. A method in accordance with claim 10 wherein at least two side chain polymer optical waveguiding layers are applied in step(c).

12. A method in accordance with claim 10 wherein the thin film mask in step(e) is a photoresist composition.

13. A method in accordance with claim 10 wherein the polymer in the optical waveguiding layer is characterized by a recurring monomeric unit corresponding to the formula:

where P' is a polymer main chain unit, S' is a flexible spacer unit having a linear chain length between about 2-20 atoms; M' is a pendant group which exhibits second order nonlinear optical susceptibility, and where the pendant side chains consist of at least 25 percent of the polymer, and the polymer has a glass transition temperature above about 40° C.

14. A method in accordance with claim 13 wherein the M' group in the formula contains a biphenyl structure.

15. A method in accordance with claim 13 wherein the M' in group the formula contains a stilbene structure.

16. A method in accordance with claim 13 wherein the M' group in the formula contains an azostilbene structure.

17. A method in accordance with claim 13 wherein the side chain polymer in the optical waveguiding layer is characterized by a recurring monomeric unit corresponding to the formula:

or where m is an integer of at least 5; n is an integer between about 2-20; X is $-NR-$, $-O-$ or $-S-$; R is hydrogen or a $C_1-C_4$ alkyl; and Z is $-NO_2$, $-CN$, $-CF_3$, $-CH=C(CN)_2$, $-C(CN)=C(CN)_2$ or $-SO_2CF_3$.

18. A method in accordance with claim 13 wherein the side chain polymer in the optical waveguiding layer is a copolymer of 4-[N-2-methacroyloxyethyl)-N-methylamino]-4'-nitrostilbene and a $C_1-C_6$ alkyl acrylate or methacrylate.

19. A method in accordance with claim 13 wherein the electric field applied in step (g) is a DC field of at least about 100 V per micron.

* * * * *